United States Patent

Kalotay

[15] 3,691,838

[45] Sept. 19, 1972

[54] PULSE SYSTEM AND COMPONENTS THEREOF

[72] Inventor: Paul Zoltan Kalotay, Monterey Park, Calif.

[73] Assignee: International Telephone and Telegraph Corporation, New York, N.Y.

[22] Filed: Jan. 29, 1971

[21] Appl. No.: 110,898

[52] U.S. Cl. ..........73/231 M, 73/205 D, 235/151.34

[51] Int. Cl. ..........G01f 1/04

[58] Field of Search ..........73/229, 231, 205 D, 151; 307/243; 328/45, 48, 60, 61; 235/151.34

[56] References Cited

UNITED STATES PATENTS

| | | | |
|---|---|---|---|
| 2,685,798 | 8/1954 | Goble | 73/362 A |
| 3,425,274 | 2/1969 | Clement et al. | 73/194 R |
| 3,268,821 | 8/1966 | Fuh-lin Wang | 328/61 X |

*Primary Examiner*—Richard C. Queisser
*Assistant Examiner*—Arthur E. Korkosz
*Attorney*—C. Cornell Remsen, Jr., Walter J. Baum, Paul W. Hemminger, Charles L. Johnson, Jr. and Thomas E. Kristofferson

[57] ABSTRACT

A total mass flowmeter which employs a conventional flowmeter turbine to produce output pulses at a rate directly proportional to the volume flow rate. A number of different, constant frequency clock pulses are then transmitted to a frequency divider periodically, the said number being directly proportional to density. The divider output pulses are then stored and inserted half way between the leading edges of the turbine meter output pulses. A unique circuit deletes every tenth meter output pulse. A decade divider provides this output with a synchronizing gate for the clock pulses.

17 Claims, 2 Drawing Figures

INVENTOR
PAUL Z. KALOTAY
BY
ATTORNEY

INVENTOR
PAUL Z. KALOTAY

BY:

ATTORNEY.

PULSE SYSTEM AND COMPONENTS THEREOF

BACKGROUND OF THE INVENTION

This invention relates to pulse correction systems, and more particularly, to a system for varying the number of pulses in a pulse train.

The invention will have a wide variety of uses and should not, therefore, be limited to those disclosed herein. However, the invention has been found to possess considerable utility when employed in connection with total mass flowmeters.

In the prior art, it has been the practice to produce a pulse train with a number of pulses varying in accordance with the product of the volume flow rate and the density of a fluid to obtain the total mass flow. The total mass flow is thus obtained simply by the use of a conventional pulse counter. The following U.S. Pats. are representative of this prior art: Nos. 2,859,619; 3,176,514; 3,184,975; 3,315,524; and 3,425,274.

In the metering of many fluids such as petroleum liquids, the density of the fluid can be accurately calculated simply by using a known constant for the fluid and the temperature of the fluid. A petroleum liquid expands with an increase temperature. This expansion thus varies the fluid density.

It is important particularly in metering petroleum liquid fuels to obtain the total mass flow rather than the total volume flow because the total heating value of such a fuel is constant with mass but varies with temperature.

Fluid temperature may vary a small amount from day to day or from hour to hour. However, for large flow rates, a small change in density can make a substantial difference in the price to be billed for the amount of fluid delivered. Further, a small change in density is often encountered.

In the prior art, the pulse output of a conventional turbine flowmeter has been altered to correct for changes in density. However, no means were used to accurately correct for small density changes.

SUMMARY OF THE INVENTION

In accordance with the system of the present invention, the above-described and other disadvantages of the prior art are overcome by providing a clock pulse generator, the output of which is gated to a frequency divider. Gating may be varied in accordance with one or more variables including, but not limited to, fluid temperature. The output of the divider may then be added to a pulse train having a number of pulses approximately equal to the total volume flow.

It is one outstanding feature of the invention that the divider stores the gated pulses even though only a few may be generated at a time. The divider output is then inserted into the mainstream of pulses, for example, upon reset. One pulse per ten flowmeter pulses may thus be added. However, there is no limit. That is, the pulse ratio may not be 1:10, but may be, for example, 1:1,000 or 1:100,000. Thus, the system of the present invention is extremely accurate.

Another feature of the invention resides in inserting the divider output pulses into the mainstream of pulses in spaced relation to the mainstream pulses for accurate counting.

Still another feature of the invention resides in producing a gating pulse synchronously with the flowmeter output.

A further feature of the invention resides in the use of a simple counter circuit which can delete one pulse out of each set of n flowmeter pulses. The same circuit can also supply a gating pulse synchronizing signal.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
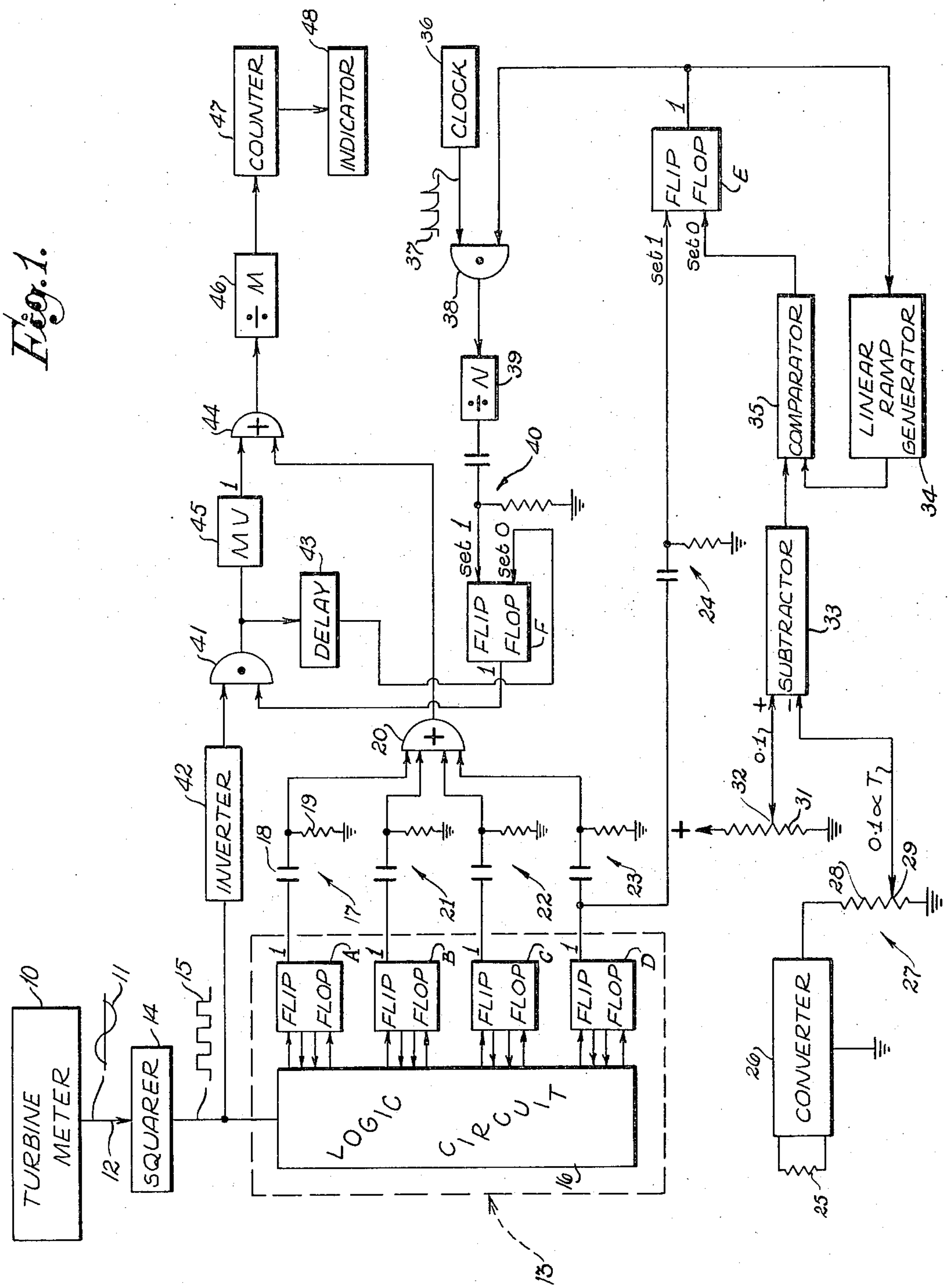
FIG. 1 is a block diagram of one embodiment of the system of the present invention.

In FIG. 1, a conventional flowmeter of the turbine type is indicated at 10. Turbine meter 10 may have the conventional magnetic pick-ups to produce an approximately sine wave output signal 11 at its output 12.

Also shown in FIG. 1 is an entirely conventional decade counter 13. Counter 13 is a binary counter which counts to 10. In other words, counter 13 has 10 stable states. Counter 13 resets to the "0" state upon receipt of the eleventh pulse from a squarer 14 connected between turbine meter 10 and counter 13.

The output of squarer 14 is a pulse train 15 which has a mark-to-space ratio of 1:1. The frequency of pulses 15 is directly proportional to the volume flow rate of the fluid flowing in the pipeline in which turbine meter 10 is installed.

Counter 13 includes a logic circuit 16 having flip-flops A, B, C and D connected thereto in the conventional manner. The output of squarer 14 is provided to the input of logic circuit 16. A differentiator 17 is connected from the "1" output of flip-flop A. Differentiator 17 includes a capacitor 18 and a resistor 19. Differentiator 17 is connected from the "1" output of flip-flop A to one input of an OR gate 20.

Similarly, differentiators 21, 22 and 23 are connected, respectively, from the "1" outputs of flip-flops B, C and D to three other corresponding inputs to OR gate 20. Differentiators 21, 22 and 23 may be identical to differentiator 17. The same is true of differentiator 24 which connects the "1" output of flip-flop D to the set "1" input of a flip-flop E.

As might be expected, flip-flop A may be the units flip-flop; flip-flop B, the two's flip-flop; flip-flop C, the four's flop-flop and flip-flop D, the eight's flip-flop.

A temperature sensitive resistor 25 senses the temperature of the fluid passing through turbine meter 10. A converter 26 connected from resistor 25 converts the temperature sensed into a current directly proportional to temperature.

This current is passed through a potentiometer 27 having a winding 28 and a wiper 29.

The voltage appearing at wiper 29 is directly proportional to $0.1\,\alpha T$.

A potentiometer 30, having a winding 31 and a wiper 32, produces an output signal directly proportional to 0.1. Wiper 29 is connected to the minus input of a subtractor 33. Wiper 32 is connected to the plus input of subtractor 33.

A linear ramp generator 34 is connected from the "1" output of flip-flop E. Ramp generator 34 may be, in fact, connected from the "0" output of flip-flop E if the particular circuit of ramp generator 34 is better adapted for that purpose. At any rate, when flip-flop E is set to the "1" state, the output of ramp generator 34 is a voltage which changes an amount directly proportional to the time elapsed from the time that flip-flop E is set to the "1" state.

A comparator 35 is connected from the output of ramp generator 34 and from the output of subtractor 33 to the set "0" input of flop-flop E. Thus, when the amplitude of the output of ramp generator 34 becomes equal to the output of subtractor 33, comparator 35 sets flop-flop E to the "0" state.

In accordance with the foregoing, it will be appreciated that the output of subtractor 33 will be directly proportional to the term $(1 - \alpha T$ It is well known that petroleum liquids change in density according to this term. That is, $d = d_r (1 - \alpha T)$, where d is the density of a fluid at an elevated temperature, $d_r$ is the density of the fluid at a reference temperature, $\alpha$ is a known factor for the liquid and T is temperature in degrees Rankin. For example, the American Petroleum Institute Table may be consulted for the $\alpha$ factors.

The output of subtractor 33 is thus directly proportional to density. Similarly, a square wave appears periodically at the "1" output of flip-flop E which has a time width directly proportional to density. Note will also be taken that the frequency of the output pulses on the "1" output of flip-flop E is one-tenth the frequency of the output pulses 15 of squarer 14.

A source of clock pulses or a clock is indicated at 36 for producing pulses 37 which are impressed upon one input of an AND gate 38. The "1" output of flip-flop E is also impressed upon another input to the AND gate 38. A frequency divider 39 is connected from the output of AND gate 38.

A storage flip-flop F is also provided. A differentiator 40 is connected from the output of divider 39 to the set "1" input of flip-flop F. Differentiator 40 may be identical to differentiator 17.

An AND gate 41 has one input from the "1" output of flip-flop F. An inverter 42 is connected from the output of squarer 14 to another input of AND gate 41. A delay device 43 is connected from the output of AND gate 41 to the set "0" input of flip-flop F. An OR gate 44 is supplied with one input from OR gate 20. A monostable multivibrator 45 is connected from the output of AND gate 41 to another input of OR gate 44. The "1" output of multivibrator 45 is connected to OR gate 44. A frequency divider 46 is connected from OR gate 44 to a counter 47. An indicator 48 is connected from counter 47.

Each box shown in FIG. 1, by itself, is entirely conventional. This is also true of all the capacitors, resistors and potentiometers shown in FIG. 1. However, the arrangement of the previously described boxes and circuit components is new.

As explained previously, turbine meter 10 is old in the art. Squarer 14 is also old in the art. The same is true of counter 13. However, the outputs of counter 13 are novely taken. Converter 26 and resistor 25 are conventional. For example, it is common to employ a temperature sensitive resistor in a bridge circuit to obtain a voltage which is a function of temperature, and then to convert the voltage to a current.

When the "1" output of flip-flop E goes low, the output of ramp generator 34 is then reset to the position from which it always integrates when the "1" output of flip-flop E goes to the high state.

Preferably the pulse repetition frequency (PRF) of the output pulses 37 of clock 36 is relatively high in comparison to the reciprocal of the minimum pulse width of the pulses appearing at the "1" output of the flip-flop E. The accuracy of the invention is limited only by the PRF of clock pulses 37 and the size of divider 39. That is, as the PRF of clock pulses 37 is raised, the number by which divider 39 divides is preferably increased so as to keep a proper constant of proportionality.

Divider 39 is simply a conventional binary counter with indicator reset, as is conventional. The same is true of divider 46.

Counter 47 may also be a conventional binary counter with manual reset, if desired.

Indicator 48 may also be conventional. For example, indicator 48 may simply produce a binary indication of the state of counter 47 by having one incandescent lamp connected from the "1" output of each flip-flop in counter 47.

Figure 2:
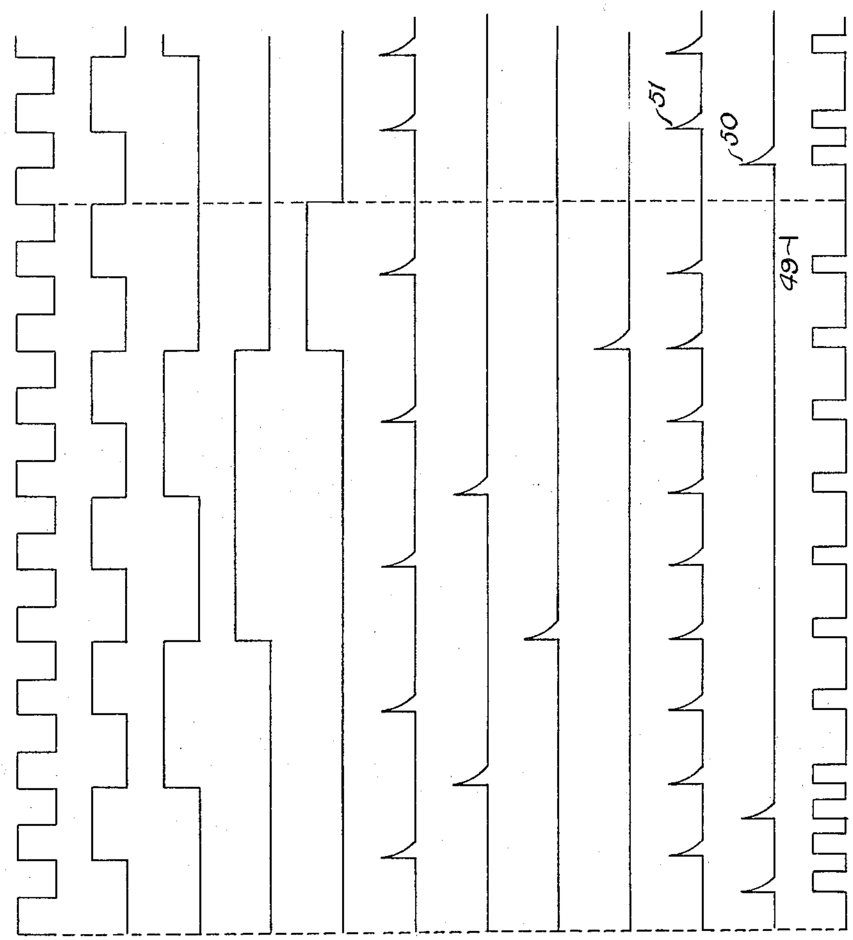
FIG. 2 is a graph of a group of waveforms characteristic of the operation of the invention.

The operation of the invention may be better understood by first reviewing the waveforms shown in FIG. 2. In FIG. 2, the waveform (a) illustrates the output of squarer 14. The waveform illustrated at (b) is the "1" output of flip-flop A. The waveform illustrated at (c) is the "2" output of flip-flop B. The waveform illustrated at (d) is the "1" output of flip-flop C. The waveform illustrated at (e) is the "1" output of flip-flop D. The waveform illustrated at (f) is the output of differentiator 17. The waveform illustrated at (g) is the output of differentiator 21. The waveform illustrated at (h) is the output of differentiator 22. The waveform illustrated at (i) is the output of differentiator 23. The waveform illustrated at (j) is the output of OR gate 20. The waveform illustrated at (k) is the output of flip-flop E. The waveform illustrated at (l) is the output of OR gate 44.

OPERATION

In the operation of the embodiment shown in FIG. 1, as stated previously, squarer 14 produces output pulses 15 indicated at (a) which have a mark-to-space ratio of 1:1. The frequency of pulses 15 is directly proportional to the volume flow rate. On receiving the 8th, 18th, 28th, etc., pulses, the "1" output of flip-flop D goes high. Flip-flop E is thus set to the "1" state, and ramp generator 34 integrates. A gating pulse is then produced at the "1" output of flip-flop E which gates a number of the constant PRF clock pulses 37 to divider 39 through gate 38. Note will be taken that if the number of clock pulses 37 is small at the end of the gating pulse supplied by flip-flop E, divider 39 may not reset and may not produce an output pulse. However, divider 39 will store those pulses introduced to it by AND gate 38 and eventually produces an output pulse depending upon the circumstances. As an output pulse is produced by divider 39, flip-flop F will be set to the "1" state. Flip-flop F is thus a storage flip-flop which waits until inverter 42 tells AND gate 41 that the time is right or correct to supply OR gate 44 with a pulse. The correct time selected is that time which is midway between two adjacent pair of the output pulses of OR gate 20. However, OR gate 20 deletes one out of every 10 pulses. Note that no pulse exists in the dotted line positions in waveform (j) in FIG. 2. Thus, if no figures exist in waveform (j) at the reset positions shown in dotted lines, a pulse may be inserted at position 49, although none is shown there. Alternatively, a pulse may be inserted and is inserted at 50 between the reset position and the next succeeding pulse output of OR gate 20 which is indicated at 51 in FIG. 2.

Delay 43 resets flip-flop F to the "0" state shortly after multivibrator 45 is actuated by AND gate 41 to supply an input pulse to OR gate 44.

Divider 46 may be used or omitted, as desired. Divider 46 simply reduces the required capacity of counter 47. Indicator 48 thus indicates the total mass flow.

From the foregoing, it will be appreciated that if all additional pulses are to be inserted in between any two adjacent pulses of the output of OR gate 20, the output of divider 39 cannot have a PRF which exceeds the PRF of input pulses 15.

The PRF of pulses 15 may typically run from 10 hertz to 5,000 hertz. Typically, clock 36 may have a PRF of 200 kilohertz. The pulse width appearing at the "1" output of flip-flop E may typically be 0—2 millisecond.

In some cases, counter 13 may be omitted, and pulses introduced via differentiators, or not, to OR gate 44 and to the set "1" input of flip-flop E.

Converter 26 and resistor 25, with or without additional structure, may be referred to as "sensor means." Further, any sensor means may be employed.

Inverter 42, AND gate 41, multivibrator 45, delay device 43 and flip-flop F may be referred to as "insertion means."

Flip-flop E and one or more or none of the structure connected thereto may be referred to as "gating signal means."

It is to be understood that although total mass flow may be determined by viewing indicator 48, the output of divider 46 may be employed to produce an indication of the rate of mass flow.

The desirability of maintaining the PRF of the output of divider 39 below a certain value can be expressed another way. That is, the following relationship should be maintained when it is desired that the PRF of the output of divider 39 be not greater than the PRF of the output pulses 15 of squarer 14.

$$\frac{f_c f_s w_{max.}}{N f_t} \leq 1$$

where, $f_c$ is the PRF of the pulses 37 appearing at the output of clock 36, $f_t$ is the PRF of the pulses 15 appearing at the output of squarer 14, $f_s$ is the PRF of the pulses appearing at the output of flip-flop E, $w_{max.}$ is the maximum pulse width of the pulses appearing at the output of flip-flop E, and $N$ is a positive integer equal to the divisor of divider 39. Further, note will be taken that:

$$\frac{f_t}{f_s} = k$$

where $k$ is a positive integer. In particular, $k = 10$.

What is claimed is:

1. In a system for generating a train of pulses, the combination comprising: first means to provide a first series of pulses; a first OR gate; second means responsive to the output of said first means to impress a second series of pulses on said first OR gate synchronously with a plurality of said first series of pulses; a clock to produce a third series of pulses at a substantially constant pulse repetition frequency; a first AND gate connected from the output of said clock; sensor means to produce an output signal which is a function of at least one variable; third means responsive to the output of said first means and to said sensor means output signal for producing a gating signal output having a time width which varies with said sensor means output signal and has a pulse repetition frequency directly proportional to that of said first series of pulses, said gating signal output being connected to the input of said first AND gate; a first frequency divider connected from the output of said first AND gate; and fourth means responsive to the output of said first means and to the pulse output of said first divider and connected from the outputs of said first divider and said first means to the input of said first OR gate to supply a pulse to said first OR gate in spaced relation to said second series of pulses contemporaneously with each pulse appearing at the output of said first divider.

2. The invention as defined in claim 1, wherein said first means includes a turbine meter, and a squarer connected from said turbine meter, a second frequency divider connected from said first OR gate, an output counter connected from said second divider, and output means to indicate the count of said counter.

3. The invention as defined in claim 1, wherein said first means includes a turbine meter, and a squarer connected from said turbine meter, said second means including a binary counter having flip-flops A, B, C and D, a third OR gate, a differentiator connected from the "1" output of each of the flip-flops A, B, C and D to said third OR gate, said third OR gate having its output connected to the input os said first OR gate, said sensor means including means to produce an output directly proportional to the term, $(1.0 - \alpha T)$, where $\alpha$ is a constant depending upon the fluid flowing through said turbine meter, and T is temperature in degrees Rankin, said third means including a flip-flop E, a linear ramp generator, and a comparator, a differentiator connected between the "1" output of said D flip-flop to the set "1" input of said E flip-flop, the output of said comparator being connected to the "0" input of said E flip-flop, the output of said sensor means being connected to the input of said comparator, the output of said ramp generator being connected to the input of said comparator, said ramp generator being connected from the output of said E flip-flop, the output of said E flip-flop being connected to the input of said first AND gate, an F flip-flop, a differentiator connected from the output of said first divider to the set "1" input of said F flip-flop, a second AND gate, an inverter connected from said squarer to the input of said second AND gate, the "1" output of said F flip-flop being connected to the input of said second AND gate, a monostable multivibrator connected from the output of said second AND gate to the input of said first OR gate, and a delay device connected from the output of said second AND gate to the set "0" input of said F flip-flop.

4. The invention as defined in claim 3, including a frequency divider and an output counter connected in succession from the output of said first OR gate, and means to indicate the state of said output counter.

5. In a system for generating a train of pulses, the combination comprising: first means to generate a first series of pulses, second means to to generate a second series of pulses synchronously with said first series and of a pulse repetition frequency (PRF) not greater than that of said first pulse series; third means to change the widths of said second series of pulses in accordance with at least one variable; a clock to produce a third series of pulses at a substantially constant PRF substantially larger than the reciprocal of the minimum pulse width of said second series of pulses; an AND gate; a frequency divider connected from the output of said AND gate; and fourth means to establish a pulse train including pulses corresponding to a predetermined number of those appearing at the output of said first means and all those appearing at the output of said divider, the outputs of said clock and said second means being connected to the input of said AND gate.

6. The invention as defined in claim 5, wherein the following relationship is maintained:

$$\frac{f_c f_s w_{max.}}{N f_f} \leq 1$$

where, $f_c$ is the pulse repetition frequency (PRF) of said third series of pulses, $f_f$ is the PRF of said first series of pulses, $f_s$ is the PRF of said second series of pulses, $w_{max.}$ is the maximum pulse width of said second series of pulses, and $N$ is a positive integer equal to the divisor of said divider.

7. The invention as defined in claim 6, wherein $$\frac{f_f}{f_s} = k$$

where $k$ is a positive integer.

8. The invention as defined in claim 7, wherein $k = 10$.

9. The invention as defined in claim 8, wherein said predetermined number of those pulses appearing at the output of said first means includes the first nine of each successive set of ten pulses, said fourth means having connections to provide sets of nine corresponding pulses to the exclusion of the tenth pulse.

10. In a system for generating a train of pulses, the combination comprising: first means to generate a first series of pulses; second means to generate a second series of pulses at a pulse repetition frequency less than that of said first series of pulses; third means connected from said first and second means to produce first pulses corresponding to at least some of those appearing at the output of said first means and to produce second pulses corresponding to at least some of those appearing at the output of said second means, said third means being adapted to produce all of said second pulses in spaced relation to all of said first pulses; said third means including a main OR gate, fourth means connected from said first means to said main OR gate to supply a predetermined number $n_o$ of each successive set of $n_s$ pulses in said first series, where $n_o$ is any positive integer not greater that $n_s$, fifth means to store each successive pulse appearing at the output of said second means, and sixth means responsive to a signal synchronous with said first series of pulses to provide an input pulse to said OR gate upon the simultaneous occurrence of first and second conditions, said first condition being that said fifth means contains a pulse in storage, said second condition being that no pulse appears at the output of said fourth means.

11. The invention as defined in claim 10, wherein said fifth means includes a flip-flop, said first means producing output pulses having a mark-to-space ratio of about unity, said sixth means including an AND gate, an inverter connected from said first means to the input of said AND gate, the "1" output of said flip-flop also being connected to the input of said AND gate, said second means being connected to the set ["1" input of said flip-flop, a delay device connected from the output of said AND gate to the set "0" input of said flip-flop, and a monostable multivibrator connected from the output of said AND gate to the input of said main OR gate.

12. The invention as defined in claim 11, wherein said fourth means includes a binary counter having 10 different stable states and being connected for automatic reset, said counter being connected from said first means, said counter having flip-flops A, B, C and D, an auxiliary OR gate having its output connected to the input of said main OR gate, and first, second, third and fourth differentiators connecting the "1" outputs of said A, B, C and D flip-flops, respectively, to the input of said auxiliary OR gate, said flip-flops A, B, C and D carrying the units, two's, four's and eight's weight, respectively.

13. The invention as defined in claim 12, wherein the "1" output of said D flip-flop is connected to said second means, said second series of pulses being generated synchronously with said "1" output of said D flip-flop.

14. The invention as defined in claim 10, wherein said fourth means includes a binary counter having 10 different stable states and being connected for automatic reset, said counter being connected from said first means, said counter having flip-flops A, B, C and D, an auxiliary OR gate having its output connected to the input of said main OR gate, and first, second, third and fourth differentiators, connecting the "1" outputs of said A, B, C and D flip-flops, respectively, to the input of said auxiliary OR gate, said flip-flops A, B, C and D carrying the units, two's, four's and eight's weight, respectively.

15. The invention as defined in claim 14, wherein the "1" output of said D flip-flop is connected to said second means, said second series of pulses being generated synchronously with said "1" output of said D flip-flop.

16. In a system for generating a train of pulses, the combination comprising: means to produce a first series of pulses; a binary counter connected from said means, said counter having ten stable states and being connected for automatic reset, said counter having flip-flops A, B, C and D; a first OR gate; and first, second, third and fourth differentiators connecting the "1" outputs of said A, B, C and D flip-flops, respectively, to the input of said first OR gate, said flip-flops A, B, C and D carrying the units, two's, four's and eight's weight, respectively.

17. The invention as defined in claim 16, including first auxiliary means to generate pulses at a pulse repetition frequency (PRF) less than that of said first series of pulses, a second OR gate connected from the output of said first OR gate; second auxiliary means responsive to the output of said first auxiliary means to supply one pulse to the input of said second OR gate for each output pulse of said auxiliary means and in spaced relation to all of those pulses appearing at the output of said first OR gate, said second auxiliary means being responsive approximately to the PRF of said first series of pulses, and a differentiator connected from the "0" output of said D flip-flop to one input of said first auxiliary means, said first auxiliary means being adapted to generate pulses in synchronism with the differentiator pulse input thereto.

* * * * *